US012753614B1

(12) United States Patent
Zhou

(10) Patent No.: US 12,753,614 B1
(45) Date of Patent: Oct. 6, 2026

(54) KNEE-GUARD KNEELING BOARD FOR CONCRETE LEVELING

(71) Applicant: Yanyan Zhou, Kunshan (CN)

(72) Inventor: Yanyan Zhou, Kunshan (CN)

( * ) Notice: Subject to any disclaimer, the term of this patent is extended or adjusted under 35 U.S.C. 154(b) by 0 days.

(21) Appl. No.: 19/439,388

(22) Filed: Jan. 4, 2026

(51) Int. Cl.
*E04F 21/16* (2006.01)
*B25H 5/00* (2006.01)

(52) U.S. Cl.
CPC ............. *E04F 21/161* (2013.01); *B25H 5/00* (2013.01)

(58) Field of Classification Search
CPC .... A41D 13/0543; A41D 13/06; A47C 16/04; E04F 21/161; B25H 5/00
USPC ................................................ 2/24; 182/230
See application file for complete search history.

(56) References Cited

U.S. PATENT DOCUMENTS

| | | | | | |
|---|---|---|---|---|---|
| 554,776 | A * | 2/1896 | Brown | A41D 13/065 2/24 |
| 3,112,812 | A * | 12/1963 | Ramon | A41D 13/065 2/24 |
| 4,043,424 | A * | 8/1977 | Crain | E04F 21/24 182/230 |
| 4,346,784 | A * | 8/1982 | Hammond | E04F 21/161 2/24 |
| 4,789,046 | A * | 12/1988 | McDowall | E04F 21/24 2/24 |
| 6,347,404 | B1 * | 2/2002 | Iskra | A47L 13/62 2/24 |
| 7,669,920 | B1 * | 3/2010 | Petersen | A41D 13/065 297/423.39 |
| 2011/0083243 | A1 * | 4/2011 | Bristrup | A41D 13/065 2/22 |
| 2019/0000160 | A1 * | 1/2019 | Marella | A47C 16/04 |
| 2023/0086218 | A1 * | 3/2023 | Thompson | A63C 9/002 280/14.1 |

* cited by examiner

*Primary Examiner* — Uyen T Nguyen
(74) *Attorney, Agent, or Firm* — JEEN IP LAW, LLC

(57) ABSTRACT

A knee-guard kneeling board for concrete leveling includes a sliding kneeling board, a support assembly, a fixing assembly, and a lifting assembly. The sliding kneeling board is precision-polished to form a mirror-finished structure, and the sliding kneeling board is fixedly provided with a cushion block. The fixing assembly is located on a side of the sliding kneeling board close to the cushion block. A limiting assembly is disposed on a side of the sliding kneeling board away from the cushion block, and the limiting assembly is adjusted in a length direction of the sliding kneeling board. The lifting assembly is fixed at an end of the sliding kneeling board, and the sliding kneeling board includes a horizontal segment and two upward-sloped segments, where the two upward-sloped segments are respectively fixed at both ends of the horizontal segment, and the horizontal segment and the upward-sloped segments are integrally formed.

6 Claims, 3 Drawing Sheets

KNEE-GUARD KNEELING BOARD FOR CONCRETE LEVELING

TECHNICAL FIELD

The present disclosure relates to the field of building construction, and in particular to a knee-guard kneeling board for concrete leveling.

BACKGROUND

In the concrete construction process of constructional engineering, floor leveling is a critical process that directly affects the final construction quality, and the construction effect is closely related to the subsequent floor decoration and service performance. Corresponding industry operation methods have been proposed based on differences in construction area: a construction worker usually performs small-area concrete leveling directly with a trowel in hand; and to prevent surface damage caused by the construction worker's directly stepping on the uncured concrete during the large-area operation, the construction worker needs to wear a pair of special mud boots with simply processed plates attached thereto, to achieve standing and moving operations, where the plates increase a concrete contact area.

Simple plates currently used in the industry are mostly temporarily made by construction workers using scrap metal plates, wooden boards, and other materials, thereby lacking the targeted structural design, and exposing significant defects in practical applications, including the most prominent problem of poor stability of fixation between a fixing plate and a construction worker's leg. Since a simple plate has no dedicated fixing and limiting structure, the mud boot and the plate are preliminarily fitted relying on the friction therebetween, and when moving on the concrete surface, the plate is easily displaced relative to the mud boot, and even the plate may be detached. To ensure the operation continuity, the construction worker has to frequently stop the leveling operation, bend down or stand up to adjust the position of the plate and re-fix. This process not only interrupts the continuity of the leveling operation, significantly reduces the construction efficiency, but also causes obvious joint marks and height differences on the concrete surface due to the interrupted operation, thereby affecting the floor flatness and overall construction quality.

Additionally, during the process of adjusting the plate, the construction worker needs to change postures repeatedly, which increases physical consumption, easily leads to fatigue after prolonged work, and further reduces the accuracy of subsequent operations. Additionally, simple plates are not designed based on ergonomic principles, and when the construction worker operates in a kneeling posture, the knee is directly in contact with a hard plate, thereby lacking effective cushioning support, which easily causes compression damage to a knee area, increases the friction resistance between the plate and the concrete surface during movement, makes the pushing process laborious, and increases the operation burden of the construction worker.

SUMMARY

An objective of the present disclosure is to provide a knee-guard kneeling board for concrete leveling to solve the problems in the prior art that unstable fixation of a mobile plate used by a construction worker for concrete leveling leads to displacement and detachment, and frequent adjustments reduce efficiency and quality, and aggravate the construction worker's fatigue and knee injury.

To achieve the above objective, the present disclosure provides the technical solution as follows: A knee-guard kneeling board for concrete leveling, includes a sliding kneeling board, a support assembly, a fixing assembly, and a lifting assembly, where a bottom surface of the sliding kneeling board is precision-polished to form a mirror-finished structure, and an end of the sliding kneeling board is fixedly provided with a cushion block configured to support a user's knee;

- a fixing assembly is located on a side of the sliding kneeling board close to the cushion block and configured to fix the user's lower leg;
- a limiting assembly is disposed on a side of the sliding kneeling board away from the cushion block, and the limiting assembly is adjusted in a length direction of the sliding kneeling board and configured to limit the user's foot; and
- the lifting assembly is fixed at an end of the sliding kneeling board and configured to carry the knee-guard kneeling board.

Further, the sliding kneeling board includes a horizontal segment and two upward-sloped segments, the two upward-sloped segments are respectively fixed at both ends of the horizontal segment, the horizontal segment and the upward-sloped segments are integrally formed, upper surfaces of the horizontal segment and the upward-sloped segments are coplanarly provided with a sliding groove, and the sliding groove is an elongated through hole configured to cooperate with the limiting assembly to achieve adjustment.

Further, the fixing assembly includes a binding member and a plurality of pairs of connecting holes, where the connecting holes are formed on the horizontal segment of the sliding kneeling board and distributed close to the cushion block; and the binding member is a flexible webbing, both ends thereof penetrate through the paired connecting holes respectively, and a detachable fixing structure is disposed at an end of the binding member and configured to adjust binding tightness.

Further, the limiting assembly includes two U-shaped frames and a plurality of locking members, where the U-shaped frame has a U-shaped structure, and both ends thereof are fitted against an inner wall of the sliding kneeling board; and the locking member includes a first bolt, a first nut, and a gasket, where the first bolt penetrates through an end of the U-shaped frame and the sliding groove and is locked and fixed via the first nut, and the gasket is sandwiched between the first nut and the sliding kneeling board.

Further, the U-shaped frame is in sliding engagement with the sliding groove through the locking member, after the first nut is loosened, the U-shaped frame moves in the length direction of the sliding groove, a spacing between the two U-shaped frames is adjusted to adapt to different shoe sizes, and the U-shaped frame and the sliding kneeling board are relatively fixed after locking.

Further, the lifting assembly includes a handle and a fixing member, and the fixing member includes a second bolt and a second nut, where the second bolt penetrates through the upward-sloped segment of the sliding kneeling board, the second nut is threadedly connected to the second bolt to achieve fixation, and the handle is sleeved on the second bolt.

Further, the cushion block is made of a high-density flexible material, and an upper surface of the cushion block is provided with an anti-slip pattern.

Further, a detachable fixing structure of the binding member is one of a hook-and-loop fastener combination or a snap fastener combination, and a width of the binding member is not less than 2 cm.

Compared with the prior art, the knee-guard kneeling board for concrete leveling provided by the present disclosure has the following beneficial effects:

1. In the present disclosure, a bottom surface of the sliding kneeling board is polished to form a mirror-finished structure, such that friction resistance with the concrete surface is significantly reduced, and the construction worker moves the sliding kneeling board flexibly and smoothly during leveling without need to frequently stand up for position adjustment, thereby significantly improving the construction efficiency;
2. the present disclosure firmly fixes the user's lower leg to the sliding kneeling board through the binding member and the fixing assembly, and effectively limits the foot through the U-shaped frames of the limiting assembly, where the fixing assembly and the limiting assembly cooperate to form a double fixing mechanism, which ensures that the sliding kneeling board moves synchronously with the human body during the construction process and prevents displacement from affecting the leveling effect;
3. due to use of the high-density flexible material of the cushion block, the surface anti-slip pattern, and the waterproof and breathable fabric, the present disclosure not only provides flexible and stable support for the knee, disperses local pressure, but also prevents sliding when kneeling, and eliminates discomfort caused by sweat accumulation, thereby adapting to long-term construction scenarios;
4. the present disclosure flexibly adjusts the spacing between the U-shaped frames in a length direction of the sliding kneeling board through the sliding groove and the limiting assembly to adapt to different shoe sizes, makes adjustment according to a kneeling posture to enhance the comfort during use, and adjusts the tightness through the detachable fixing structure of the binding member to adapt to lower legs of different thicknesses, thereby significantly improving the versatility of the knee-guard kneeling board;
5. due to a smooth transition, and integral formation of the upward-sloped segments and the horizontal segment of the sliding kneeling board, the present disclosure prevents hard compression on the leg by ends thereof, and the flexible webbing of the binding member fits the curve of the lower leg, which reduces the sense of restraint during fixation, and improves the use comfort; and
6. the sliding kneeling board of the present disclosure is made of corrosion-resistant stainless steel, and the bottom surface of the mirror-finished structure is easily cleaned, thereby prolonging the service life.

BRIEF DESCRIPTION OF THE DRAWINGS

In order to explain technical solutions in embodiments of the present disclosure or the prior art more clearly, the accompanying drawings that need to be used in the embodiments will briefly introduced below. Apparently, the accompanying drawings in the following description are merely some embodiments of the present disclosure, and those of ordinary skill in the art would also be able to derive other drawings from these drawings.

REFERENCE NUMERALS IN THE FIGURES

Figure 1:
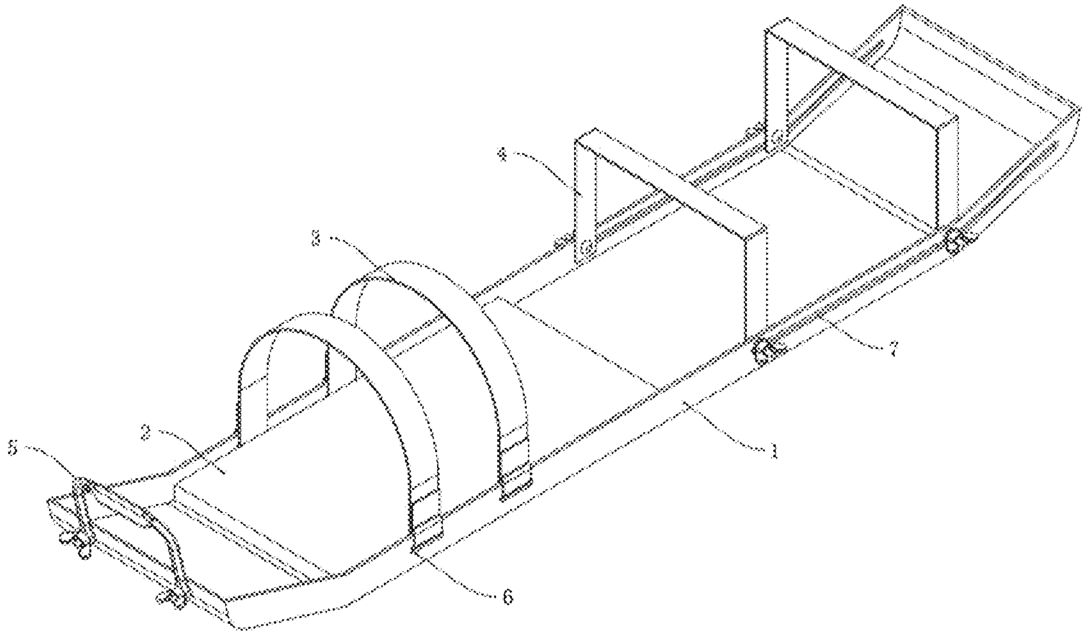
FIG. 1 is a three-dimensional schematic structural diagram of a first view of an embodiment of the present disclosure.

1—sliding kneeling board; 101—horizontal segment; 102—upward-sloped segment; 103—mirror-finished structure; 2—cushion block; 3—binding member; 4—limiting assembly; 401—U-shaped frame; 402—locking member; 4021—first bolt; 4022—first nut; 4023—gasket; 5—lifting assembly; 501—handle; 502—fixing member; 5021—second bolt; 5022—second nut; 6—connecting hole; and 7—sliding groove.

DETAILED DESCRIPTIONS OF THE EMBODIMENTS

In order to enable those skilled in the art to better understand the technical solutions of the present disclosure, the present disclosure will be further described in detail below with reference to the accompanying drawings.

As shown in FIGS. 1 to 5:

The present disclosure provides a knee-guard kneeling board for concrete leveling, including a sliding kneeling board 1, a support assembly, a fixing assembly, and a lifting assembly 5, where a bottom surface of the sliding kneeling board 1 is precision-polished to form a mirror-finished structure 103, and core advantages of this structure lie in minimizing a contact resistance with a surface of uncured concrete, preventing scratching a concrete surface layer, and ensuring the continuity of leveling and the surface flatness; an end of the sliding kneeling board 1 is fixedly provided with a cushion block 2 specially configured to support a user's knees and provide a critical cushioning effect for long-term kneeling operations; the fixing assembly is located on a side of the sliding kneeling board 1 close to the cushion block 2, and the user's lower leg is stably connected to the sliding kneeling board 1 through flexible binding to eliminate relative displacement during operation; a limiting assembly 4 is disposed on a side of the sliding kneeling board 1 away from the cushion block 2, and this assembly may be flexibly adjusted in a length direction of the sliding kneeling board 1 to achieve precise limiting on the user's foot and meet use needs of construction workers of different body types; and the lifting assembly 5 is fixed at an end of the sliding kneeling board 1, which facilitates handling and transfer of the knee-guard kneeling board, and prevents a construction worker from directly contacting a concrete contact surface to eliminate contamination or inconvenience.

During construction, the construction worker drives the sliding kneeling board 1 to slide on a concrete surface by exerting force with leg muscles, and due to the presence of the mirror-finished structure 103 on the bottom surface of the sliding kneeling board 1, a sliding process is smooth without need to apply excessive thrust, thereby effectively reducing physical consumption. During a leveling operation, the construction worker can focus on operating a trowel without need to worry about the displacement or detachment of the sliding kneeling board 1, which prevents operation interruption caused by frequent adjustment of the knee-guard kneeling board, ensures that the concrete surface is leveled in a uniform and consistent manner, and reduces the generation of joint marks and height differences. When needing to move to another operation area during an operation interval, the construction worker can directly hold a handle 501 of the lifting assembly 5 to lift and move the entire knee-guard kneeling board, and easy operation and impossibility to touch the concrete surface ensure that a leveled area is not damaged.

Figure 2:
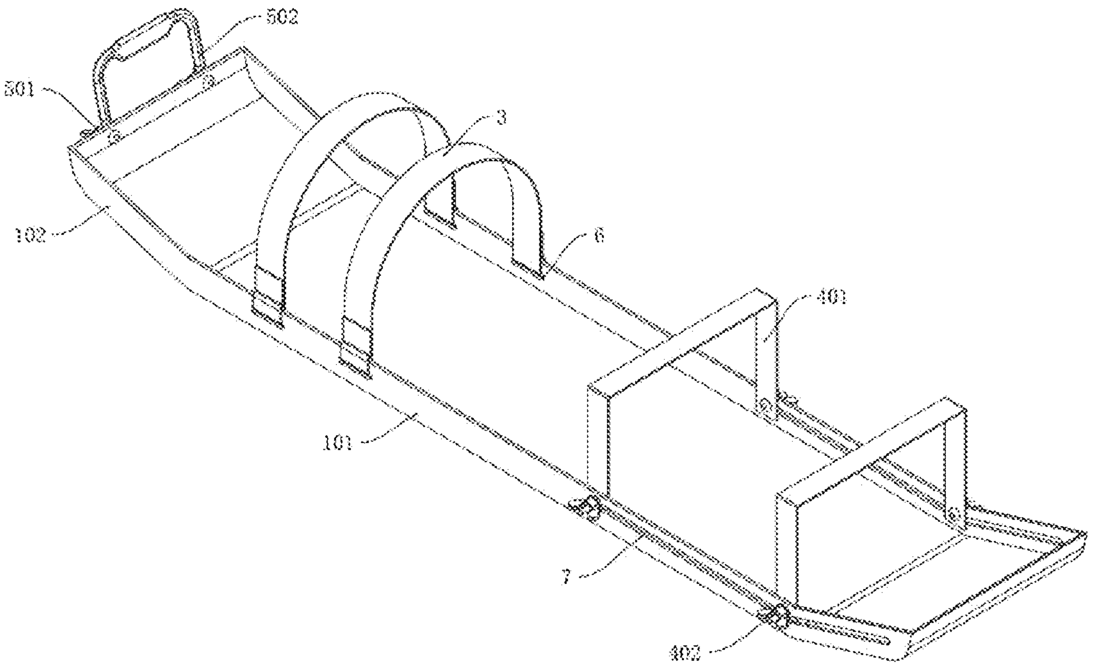
FIG. 2 is a three-dimensional schematic structural diagram of a second view of an embodiment of the present disclosure.
Figure 3:
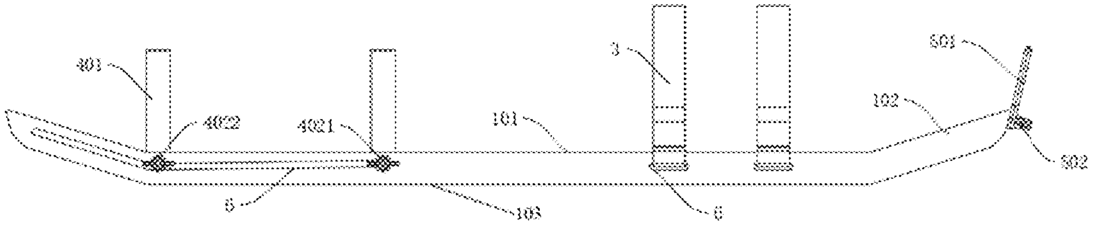
FIG. 3 is a schematic side view of an embodiment of the present disclosure.

As shown in FIGS. 1 to 3, in an embodiment of the present disclosure, the sliding kneeling board 1 includes a horizontal segment 101 and two upward-sloped segments 102, where the two upward-sloped segments 102 are respectively fixed at both ends of the horizontal segment 101 and made by an integral molding process; and this structural design not only ensures overall structural strength of the sliding kneeling board 1 and eliminates the problem of easy fracture at joints, but also forms a smooth transition between the horizontal segment 101 and the upward-sloped segments 102, and prevents hard compression or scratching on the construction worker's leg during use. The horizontal segment 101 serves as a main support area, and provides sufficient space for placing the knee, lower leg, and foot, thereby ensuring the stability of kneeling; and the upward-sloped segments 102 play a role of guidance and protection, which reduces friction resistance with the concrete surface during sliding, and prevents an end of the sliding kneeling board 1 from being embedded in concrete, thereby ensuring the smoothness of movement. Upper surfaces of the horizontal segment 101 and the upward-sloped segments 102 are coplanarly provided with a sliding groove 7, where the sliding groove 7 is an elongated through hole and is a core structural basis for the limiting assembly 4 to achieve the adjustment function. A position of the sliding groove 7 is precisely designed to ensure that when moving along the sliding groove, the limiting assembly 4 is always fitted with an upper surface of the sliding kneeling board 1 without jamming or deviation.

During installation and use, the construction worker can flexibly adjust a position of the limiting assembly 4 in the sliding groove 7 according to his/her physical characteristics such as leg length and shoe size. During adjustment, by merely loosening a locking member 402, a U-shaped frame 401 is pushed to move in a length direction of the sliding groove 7 until reaching an appropriate position, and then the locking member 402 is re-locked. An elongated structure of the sliding groove 7 provides a sufficient stroke range for adjustment, and any construction worker, regardless of body type differences, can find a suitable limiting position. Additionally, the integrally formed sliding kneeling board 1 evenly disperses the pressure under load, and even slight shaking of the construction worker during operation does not cause structural deformation or fracture, thereby providing a reliable guarantee for construction safety.

As shown in FIGS. 1 to 3, in an embodiment of the present disclosure, the fixing assembly includes a binding member 3 and a plurality of pairs of connecting holes 6, where the connecting holes 6 are formed on the horizontal segment 101 of the sliding kneeling board 1 and distributed close to the cushion block 2, and the distribution is ergonomically designed to ensure that when the lower leg is fixed by the binding member 3, the lower leg remains in a most comfortable and stable position, thereby preventing uneven stress on the lower leg due to fixing point deviation. The binding member 3 is a flexible webbing made of a material with excellent toughness and wear resistance, which not only ensures sufficient fixing strength, but also fits a curve of the lower leg, and reduces the sense of restraint.

During use, flexible characteristics of the binding member 3 adapt to the slight movement of the construction worker's leg, and slight movement of the leg does not cause loosening; and additionally, width design ensures a contact area with the lower leg, disperses binding pressure, and prevents indentations on the lower leg after long-term wearing. The arrangement of the plurality of pairs of connecting holes 6 provides a variety of position choices for binding, and the construction worker selects the most suitable connecting holes 6 for fixation according to thickness and shape of his/her lower leg, further enhancing the versatility and comfort of the fixing assembly.

Figure 4:
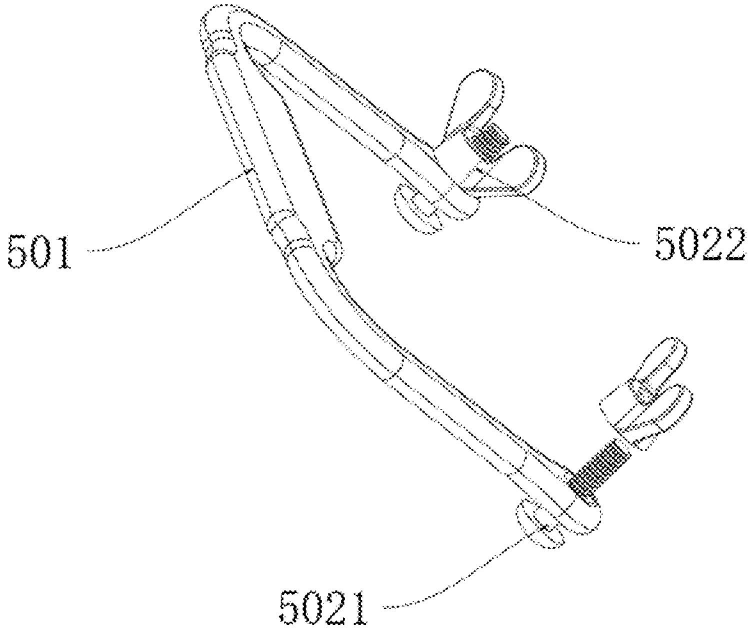
FIG. 4 is a schematic structural diagram of a lifting assembly in an embodiment of the present disclosure.

As shown in FIGS. 2 and 4, in an embodiment of the present disclosure, the limiting assembly 4 includes two U-shaped frames 401 and a plurality of locking members 402, where the U-shaped frame 401 has a U-shaped structure, and shape characteristics of the foot are fully considered in design, which achieves an enclosed limit on the foot from both sides and above, and effectively prevents the construction worker's foot from tilting forward, moving backward or turning over during sliding. Both ends of the U-shaped frame 401 are fitted against an inner wall of the sliding kneeling board 1, and the fitting design ensures that the U-shaped frame 401 remains stable during movement and use without left-right shaking, prevents generation of a gap between the U-shaped frame 401 and the sliding kneeling board 1, and prevents entry of concrete debris or dust, thereby ensuring the adjustment function. The locking member 402 includes a first bolt 4021, a first nut 4022, and a gasket 4023, and the three cooperate to achieve the fixation between the U-shaped frame 401 and the sliding kneeling board 1. The locking member 402 should be installed in the order of "first inserting the bolt, then placing the gasket, and finally screwing the nut": first, the first bolt 4021 passes through the sliding groove 7 and a mounting hole at an end of the U-shaped frame 401 from below the sliding kneeling board 1 to ensure that a head portion of the first bolt 4021 fits against the bottom surface of the sliding kneeling board 1 without loosening; then the gasket 4023 is sleeved at an upper end of the first bolt 4021, and the gasket 4023 increases a contact area between the first nut 4022 and the upper surface of the sliding kneeling board 1, which not only improves the stability of locking, prevents the nut from loosening due to vibration during use, but also prevents the first nut 4022 from directly pressing a surface of the sliding kneeling board 1, thereby preventing surface scratches or deformation; and finally, the first nut 4022 is tightened, and a tightening force should be controlled to ensure that the U-shaped frame 401 is fixed firmly, and prevent damaging the bolt or nut due to excessive force.

When a spacing between the U-shaped frames 401 is adjusted, it is only necessary to loosen the first nut 4022, and in this case, the first bolt 4021 moves freely in the sliding groove 7, which drives the U-shaped frame 401 to move synchronously until reaching a position suitable for a shoe size, and then the first nut 4022 is tightened again. The U-shaped structure of the U-shaped frame 401 adapts to different styles of construction shoes, and achieves stable limiting, and adjustment is made according to a kneeling posture, thereby improving the comfort during use. Additionally, height design ensures no excessive restriction on the movement of the ankle, and the construction worker still maintains a certain degree of flexibility during operation. Additionally, a surface of the U-shaped frame 401 is polished to prevent scratch damage to the shoe or foot caused by sharp edges.

Figure 5:
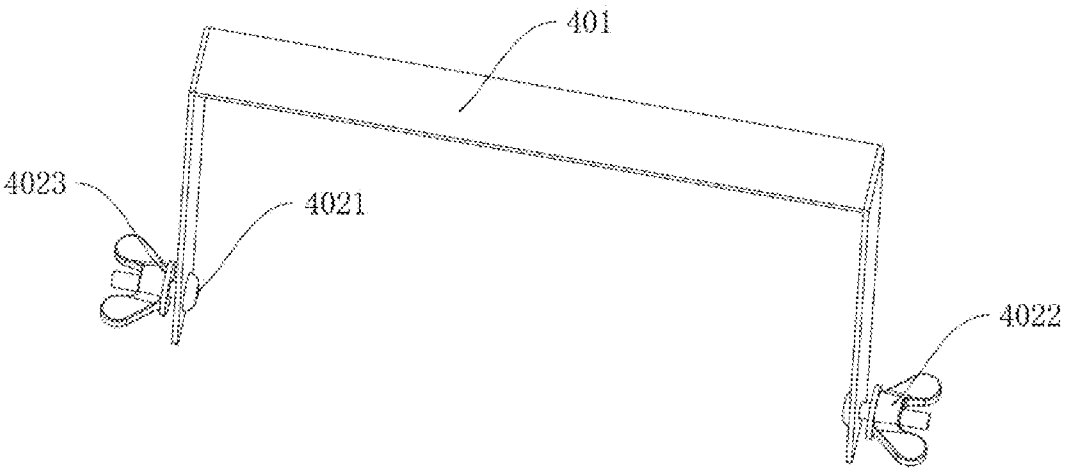
FIG. 5 is a schematic structural diagram of a limiting assembly in an embodiment of the present disclosure.

As shown in FIGS. 1 and 5, in an embodiment of the present disclosure, the U-shaped frame 401 is in sliding engagement with the sliding groove 7 through the locking member 402. After the first nut 4022 is loosened, the U-shaped frame 401 moves freely in the length direction of the sliding groove 7, without jamming or obstruction during the movement, and the construction worker quickly adjusts a spacing between the two U-shaped frames 401 to accurately adapt to his/her shoe size. After the first nut 4022 is tightened, the U-shaped frame 401 and the sliding kneeling board 1 are relatively fixed, and in this case, structural characteristics of the locking member 402 effectively prevent displacement of the U-shaped frame 401 during sliding. An anti-loosening design of the first nut 4022 resists vibration and impact during construction, prevents loosening after long-term use, and further improves the stability of the limiting assembly 4. A gap between a bottom of the U-shaped frame 401 and the upper surface of the sliding kneeling board 1 is reasonably designed, which not only ensures the smoothness of movement, but also prevents shaking of the U-shaped frame 401 caused by an excessive gap, thereby ensuring the limiting effect.

In an actual operation process, the limiting assembly 4 and the fixing assembly cooperate to jointly achieve a stable connection between the construction worker and the sliding kneeling board 1. The fixing assembly fixes the lower leg, the limiting assembly 4 limits the foot, and a double fixing mechanism ensures that when the construction worker performs operations such as sliding, turning around, and adjusting posture, the sliding kneeling board 1 always moves synchronously with the human body, without relative displacement or detachment. This cooperative design not only improves operational safety, but also prevents damage to the concrete surface caused by the displacement of the knee-guard kneeling board, and ensures construction quality. Additionally, the limiting assembly 4 has a simple structure, and is easy to disassemble and install, thereby facilitating later maintenance and replacement, and reducing the use cost.

As shown in FIGS. 1 and 4, in an embodiment of the present disclosure, the lifting assembly 5 includes a handle 501 and a fixing member 502, and the fixing member 502 includes a second bolt 5021 and a second nut 5022, where a core fixing logic is that the second bolt 5021 penetrates through two holes on the upward-sloped segment 102 and two holes on the handle 501 to achieve a stable connection between the lifting assembly 5 and the sliding kneeling board 1. The two holes on the upward-sloped segment 102 are symmetrically distributed at an end of the upward-sloped segment, and are precisely positioned to ensure complete alignment with the two holes on the handle 501 without deviation, so as to ensure that the second bolt 5021 penetrates through smoothly and prevent installation difficulty or insecure fixation due to hole misalignment. Edges of the holes are chamfered to remove sharp burrs, which not only plays a guiding role when the second bolt 5021 passes through, facilitates installation, but also prevents a thread of the second bolt 5021 from being scratched by a hole wall, thereby prolonging the service life of the bolt, reducing the stress concentration at a hole edge, and prevents cracking of the hole after long-term use. The two holes on the handle 501 are symmetrically designed, diameters of the two holes are precisely adapted to a diameter of the second bolt 5021, and inner walls of the holes are polished, which ensures that when the handle 501 is sleeved on the second bolt 5021, the handle 501 rotates flexibly to meet different gripping angle requirements of the construction worker, without shaking or loosening, thereby ensuring the stability during lifting. A flexible sleeve sleeved outside the handle 501 not only has good anti-slip properties, but also provides sufficient friction even when the hand is sweating or stained with concrete dust, which prevents detachment of the knee-guard kneeling board caused by hand slipping during lifting, plays a cushioning role, and reduces an impact force on the hand during lifting, thereby enhancing the gripping comfort. Especially during winter construction, the flexible sleeve prevents direct contact of the hand with a cold metal handle, and plays a certain thermal insulation effect, thereby improving the operation experience.

When the lifting assembly 5 is installed, the handle 501 is first placed on an outer side of the upward-sloped segment 102, and the two holes on the handle 501 are aligned with the two holes on the upward-sloped segment 102; then the second bolt 5021 passes through a hole from an inner side of the upward-sloped segment 102, and then passes through a corresponding hole on the handle 501; and finally, the second nut 5022 is threadedly connected to the second bolt 5021 and tightened, and during the tightening process, the connection between the second bolt 5021 and the second nut 5022 is ensured to be tight without loosening. The wing-shaped design of the second nut 5022 ensures manual tightening and disassembly by the construction worker without need of tools, thereby enhancing the convenience of installation and maintenance. When using the lifting assembly 5, the construction worker needs to hold the handle 501 with both hands to ensure uniform force distribution, prevent tilting of the sliding kneeling board 1 caused by single-hand lifting, and further prevent scratches on the concrete surface or damage to the knee-guard kneeling board due to detachment.

As shown in FIG. 1, in an embodiment of the present disclosure, the cushion block 2 is made of a high-density flexible material, and this material has core characteristics of good softness and compression resistance, which not only provides flexible support for the knee, but also effectively disperses the pressure on a knee area, and prevents knee soreness, numbness, and even compression injury caused by prolonged kneeling. An upper surface of the cushion block 2 is provided with an anti-slip pattern, and the design of the pattern is validated through actual operations, which significantly increases the friction between the knee and the cushion block 2, still effectively prevents the knee sliding in a kneeling posture even when the construction worker's knee is sweating or a surface of the cushion block 2 is stained with a small amount of concrete slurry, ensures the stability during the operation, and prevents physical imbalance caused by knee sliding, thereby ensuring the accuracy of leveling. The cushion block 2 is fixed on the sliding kneeling board 1 via a stainless steel bolt, and firm and reliable fixing is achieved to prevent detachment of the cushion block 2 during use. An exterior of the cushion block 2 is covered with a waterproof and breathable fabric, and the fabric not only has good anti-fouling properties, effectively prevents contaminants such as concrete slurry and dust from adhering to a surface of the cushion block, but also achieves breathability and perspiration, and prevents sweat accumulation between the knee and the cushion block caused by prolonged kneeling of the construction worker, thereby preventing stuffiness, discomfort, and even bacterial growth. Since a surface of the waterproof and breathable fabric is smooth, surface stains may be removed only by wiping with a piece of damp cloth after operation, which facilitates cleaning and prolongs the service life of the cushion block 2.

In practical applications, ergonomic principles are fully considered for the size design of the cushion block 2, and a length and width thereof enable to completely cover a knee area of an adult, thereby ensuring that the knee is comprehensively and uniformly supported, regardless of angle. Even when the construction worker slightly adjusts his/her kneeling posture during the operation, the cushion block 2 still maintains good fit with the knee, thereby preventing pressure concentration caused by local suspension. Additionally, the high-density flexible material has good deformation resistance, and still maintains its original shape and elasticity after long-term use, without problems such as collapse and hardening, thereby ensuring the comfort and support effect of long-term use.

In an embodiment of the present disclosure, a detachable fixing structure of the binding member 3 is one of a hook-and-loop fastener combination or a snap fastener combination, and both the fixing methods have their own advantages and meet the usage habits and needs of different construction workers. The hook-and-loop fastener combination has advantages of convenient opening/closing and a wide adjustment range, the construction worker can complete the fixation and disassembly only by gently fitting or tearing, and precise alignment is not required for tightness adjusting, thereby ensuring flexible and efficient operation; and the snap fastener combination has the characteristics of firm fixation and resistance to accidental loosening, and the snap fastener structure achieves locking, and effectively resists vibration and pulling during operation, thereby ensuring the reliability of fixation. A width of the binding member 3 is not less than 2 cm, the width design ensures a sufficient contact area between the binding member 3 and the lower leg, enables to evenly disperse binding pressure on a surface of the lower leg, and prevents excessive local pressure caused by a too small contact area, and even indentations on the lower leg or poor blood circulation. The flexible webbing used for the binding member 3 has good toughness and wear resistance, withstands the risk of pulling and bending during long-term use, and is less prone to breakage, wear, and other problems, thereby having a long service life. A surface of the webbing has certain water resistance due to special treatment, is not easily deformed or moldy even when stained with concrete slurry or rainwater, and still maintains a good use state after cleaning.

When the binding member 3 is used, the construction worker chooses a suitable fixing structure according to his/her own needs. The hook-and-loop fastener combination more facilitates frequent tightness adjustment during operation; and the snap fastener combination is more reliable for operation environments with significant vibrations or necessity to maintain a fixed state for a long time. Regardless of any fixing method, it is necessary to ensure that after the binding member 3 is fixed, there is no relative displacement between the lower leg and the sliding kneeling board 1, and blood circulation of the leg is not affected. Additionally, both ends of the binding member 3 are reinforced to prevent wear and fraying of ends of the webbing caused by frequent passage through the connecting holes 6, thereby further prolonging the service life of the binding member 3.

Operating principle: When working on a horizontal concrete surface, the construction worker first places the sliding kneeling board 1 in a target construction area, kneels on the cushion block 2, fixes the lower leg with the binding member 3, and places the foot between the two U-shaped frames 401; the spacing between the U-shaped frames 401 may be adjusted according to his/her body type and kneeling posture before locking to improve comfort during use; and during construction, the construction worker pushes the sliding kneeling board 1 to slide on a concrete surface by exerting force with the leg to perform leveling. When working on an inclined or uneven concrete surface, the sliding kneeling board still maintains synchronous movement with the construction worker due to the presence of the mirror-finished structure 103 of a bottom of the sliding kneeling board 1 and the double fixing mechanism, thereby preventing displacement from affecting the leveling effect. The lifting assembly 5 facilitates quick movement of the knee-guard kneeling board during an operation interval, thereby improving work efficiency. The entire knee-guard kneeling board adapts to construction workers of different body types through humanized design and an adjustable structure, effectively improving the efficiency and comfort of concrete leveling.

Some exemplary embodiments of the present disclosure are described above only by way of illustration. Undoubtedly, for those of ordinary skill in the art, various modifications may be made to the described embodiments in various ways without departing from the spirit and scope of the present disclosure. Therefore, the above accompanying drawings and descriptions are essentially illustrative and should not be construed as limiting the protection scope of the claims of the present disclosure.

The invention claimed is:

1. A knee-guard kneeling board for concrete leveling, comprising: a sliding kneeling board, a fixing assembly, and a lifting assembly, wherein a bottom surface of the sliding kneeling board is polished to form a mirror-finished structure configured to minimize a contact resistance with a surface of uncured concrete, and an end of the sliding kneeling board is fixedly provided with a cushion block configured to support a user's knee;

the fixing assembly comprising a binding member and a plurality of pairs of connecting holes is located on two sides of the sliding kneeling board close to the cushion block, wherein the binding member is configured to pass through a selected pair of the connecting holes to fix the user's lower leg;

a limiting assembly is disposed on a side of the sliding kneeling board away from the cushion block, and the limiting assembly is adjusted in a length direction of the sliding kneeling board and configured to limit the user's foot; and the lifting assembly comprising a handle and a fixing member is fixed at an end of the sliding kneeling board, and the handle of the lifting assembly is held by the user to carry the knee-guard kneeling board;

wherein the sliding kneeling board comprises a horizontal segment and two upward-sloped segments, the two upward-sloped segments are respectively fixed at both ends of the horizontal segment, the horizontal segment and the upward-sloped segments are integrally formed, upper surfaces of the horizontal segment and one of the upward-sloped segments are coplanarly provided with a sliding groove, and the sliding groove is an elongated through hole configured to cooperate with the limiting assembly to achieve adjustment;

wherein the limiting assembly comprises two U-shaped frames and a plurality of locking members, wherein each U-shaped frame has a U-shaped structure, and both ends of the U-shaped frame are fitted against an inner wall of the sliding kneeling board; and each locking member comprises a first bolt, a first nut, and a gasket, wherein the first bolt penetrates through an end of the U-shaped frame, and the sliding groove and is locked and fixed via the first nut, and the gasket is sandwiched between the first nut and the sliding kneeling board.

2. The knee-guard kneeling board for concrete leveling according to claim 1, wherein the wherein the plurality of pairs of connecting holes are formed on the horizontal segment of the sliding kneeling board and distributed close to the cushion block; and the binding member is a flexible webbing, both ends the flexible webbing penetrate through a selected pair of connecting holes respectively, and a detachable fixing structure is disposed at an end of the flexible webbing and configured to adjust binding tightness.

3. The knee-guard kneeling board for concrete leveling according to claim 1, wherein each U-shaped frame is in sliding engagement with the sliding groove through the respective locking member, after the respective first nut is loosened, the U-shaped frame moves in a length direction of the sliding groove, a spacing between the two U-shaped frames is adjusted to adapt to different shoe sizes, and the U-shaped frame and the sliding kneeling board are relatively fixed after locking.

4. The knee-guard kneeling board for concrete leveling according to claim 1, wherein the fixing member comprises a second bolt and a second nut, wherein the second bolt penetrates through one of the upward-sloped segments of the sliding kneeling board, the second nut is threadedly connected to the second bolt to achieve fixation, and the handle is sleeved on the second bolt.

5. The knee-guard kneeling board for concrete leveling according to claim 1, wherein the cushion block is made of a high-density flexible material, and an upper surface of the cushion block is provided with an anti-slip pattern.

6. The knee-guard kneeling board for concrete leveling according to claim 2, wherein the detachable fixing structure of the binding member is one of a hook-and-loop fastener combination or a snap fastener combination, and a width of the binding member is not less than 2 cm.

* * * * *